United States Patent
Bessiere et al.

(10) Patent No.: US 12,200,077 B2
(45) Date of Patent: Jan. 14, 2025

(54) ADDRESSING PREVIOUS CLIENT DEVICE TECHNOLOGY IN ONLINE PLATFORMS

(71) Applicant: Content Square SAS, Paris (FR)

(72) Inventors: Bastien Bessiere, Paris (FR); Henrique Cesar, Paris (FR); Safwen Baroudi, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/102,343

(22) Filed: Jan. 27, 2023

(65) Prior Publication Data
US 2023/0247102 A1     Aug. 3, 2023

Related U.S. Application Data

(60) Provisional application No. 63/305,232, filed on Jan. 31, 2022.

(51) Int. Cl.
| | | |
|---|---|---|
| *H04L 67/50* | (2022.01) | |
| *G06F 16/95* | (2019.01) | |
| *G06F 40/284* | (2020.01) | |
| *H04L 9/40* | (2022.01) | |
| *H04L 67/565* | (2022.01) | |
| *H04N 21/2383* | (2011.01) | |

(52) U.S. Cl.
CPC ............ *H04L 67/535* (2022.05); *G06F 16/95* (2019.01); *G06F 40/284* (2020.01); *H04L 63/08* (2013.01); *H04L 67/565* (2022.05); *H04N 21/2383* (2013.01)

(58) Field of Classification Search
CPC ..... H04L 67/535; H04L 63/08; H04L 67/565; G06F 16/95; G06F 40/284; H04N 21/2383
See application file for complete search history.

(56) References Cited

U.S. PATENT DOCUMENTS

| | | | | | |
|---|---|---|---|---|---|
| 6,112,240 | A | * | 8/2000 | Pogue | G06F 11/3466 |
| | | | | | 709/224 |
| 6,266,681 | B1 | * | 7/2001 | Guthrie | H04L 67/561 |
| | | | | | 707/999.01 |
| 6,401,238 | B1 | * | 6/2002 | Brown | G06F 8/61 |
| | | | | | 709/224 |
| 7,594,107 | B1 | * | 9/2009 | Parkhill | H04L 63/0823 |
| | | | | | 717/173 |
| 8,667,480 | B1 | * | 3/2014 | Sigurdsson | G06F 8/65 |
| | | | | | 717/170 |
| 9,443,213 | B1 | * | 9/2016 | Kataria | H04L 67/01 |
| 9,614,899 | B1 | * | 4/2017 | Rukonic | H04L 67/34 |
| 9,973,371 | B1 | * | 5/2018 | Upadhyay | H04L 67/02 |

(Continued)

*Primary Examiner* — Ramy M Osman
(74) *Attorney, Agent, or Firm* — Schwegman Lundberg & Woessner, P.A.

(57) ABSTRACT

The subject technology receives, in a request, information related to a version of a web browser of a client device. The subject technology determines, using the information related to the version of the web browser, a version of a tracking tag to provide to the client device. The subject technology selects the version of the tracking tag from among different versions of the tracking tag, each version of the tracking tag comprising different code from code of other versions of the tracking tag. The subject technology receives the version of the tracking tag from cloud storage. The subject technology sends the version of the tracking tag to the client device.

30 Claims, 8 Drawing Sheets

(56) References Cited

U.S. PATENT DOCUMENTS

| | | | | |
|---|---|---|---|---|
| 2004/0199606 A1* | 10/2004 | Brown | ................ | G06F 16/9535 |
| | | | | 709/219 |
| 2004/0205357 A1* | 10/2004 | Kuo | ................... | G06F 21/6272 |
| | | | | 726/7 |
| 2005/0132207 A1* | 6/2005 | Mourad | .............. | H04L 63/0428 |
| | | | | 713/189 |
| 2008/0016225 A1* | 1/2008 | Malik | .................... | H04L 67/14 |
| | | | | 709/227 |
| 2011/0090230 A1* | 4/2011 | Bacus | .................. | G06F 40/109 |
| | | | | 345/467 |
| 2014/0201616 A1* | 7/2014 | Turner | ................. | G06F 16/986 |
| | | | | 715/234 |
| 2014/0325374 A1* | 10/2014 | Dabrowski | ............ | G06F 3/048 |
| | | | | 715/744 |
| 2015/0143495 A1* | 5/2015 | Okada | .................... | H04L 63/08 |
| | | | | 726/7 |
| 2015/0341467 A1* | 11/2015 | Lim | ....................... | H04L 69/16 |
| | | | | 709/203 |
| 2017/0354878 A1* | 12/2017 | Posin | ...................... | A63F 13/31 |
| 2018/0063142 A1* | 3/2018 | Ashiya | ................... | H04L 63/10 |
| 2018/0349125 A1* | 12/2018 | Ito | ......................... | G06F 3/1225 |
| 2020/0252444 A1* | 8/2020 | Teglas | .................... | H04L 69/03 |
| 2021/0058656 A1* | 2/2021 | Meng | ............... | H04N 21/2383 |
| 2021/0160277 A1* | 5/2021 | Hebert | ............... | H04L 63/1466 |
| 2021/0168433 A1* | 6/2021 | Meng | ................... | H04N 21/454 |
| 2021/0243262 A1* | 8/2021 | Dudmesh | .............. | H04L 67/535 |
| 2023/0247102 A1* | 8/2023 | Bessiere | .............. | H04L 67/565 |
| | | | | 709/224 |

\* cited by examiner

US 12,200,077 B2

ADDRESSING PREVIOUS CLIENT DEVICE TECHNOLOGY IN ONLINE PLATFORMS

PRIORITY CLAIM

This application claims the benefit of priority of U.S. Provisional Patent Application No. 63/305,232, filed Jan. 31, 2022, which is hereby incorporated by reference herein in its entirety for all purposes.

BACKGROUND

The Internet is a collection of disparate computer systems which use a common protocol to communicate with each other. A common use of the Internet is to access World Wide Web (web) pages. Web pages are typically stored on a server and remotely accessed by a client over the Internet using a web browser.

To increase user visitations and revenue, websites have become very sophisticated. Web sites typically include web pages that provide information to users, advertise products or services to users and/or provide site search functions for users. A problem for website owners is how to determine how successful the website is, for example, whether the informational or other needs of users are met and whether the users are purchasing goods and services advertised on their site.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Embodiments of the subject technology determines what version of a mobile device (e.g., smartphone, and the like) is using an online platform and can deploy a newer or older version of the platform accordingly. More specifically, various features in a tracking tag may not be supported in older web browsers while new features are supported in newer web browsers. A mismatch in the version of the tracking tag that a particular web browser is provided to execute can cause errors (e.g., unsupported code or features, execution errors or exceptions, unexpected results, and the like) or performance issues (e.g, slower execution, crashes, or non-responsive code). The subject technology therefore improves the functionality of a computer (e.g., executing a web browser) by providing an appropriate version (e.g., modern or legacy) of a tracking tag to ensure optimal compatibility and performance of a given web browser and platform where feasible.

Networked Computing Environment

Figure 1:
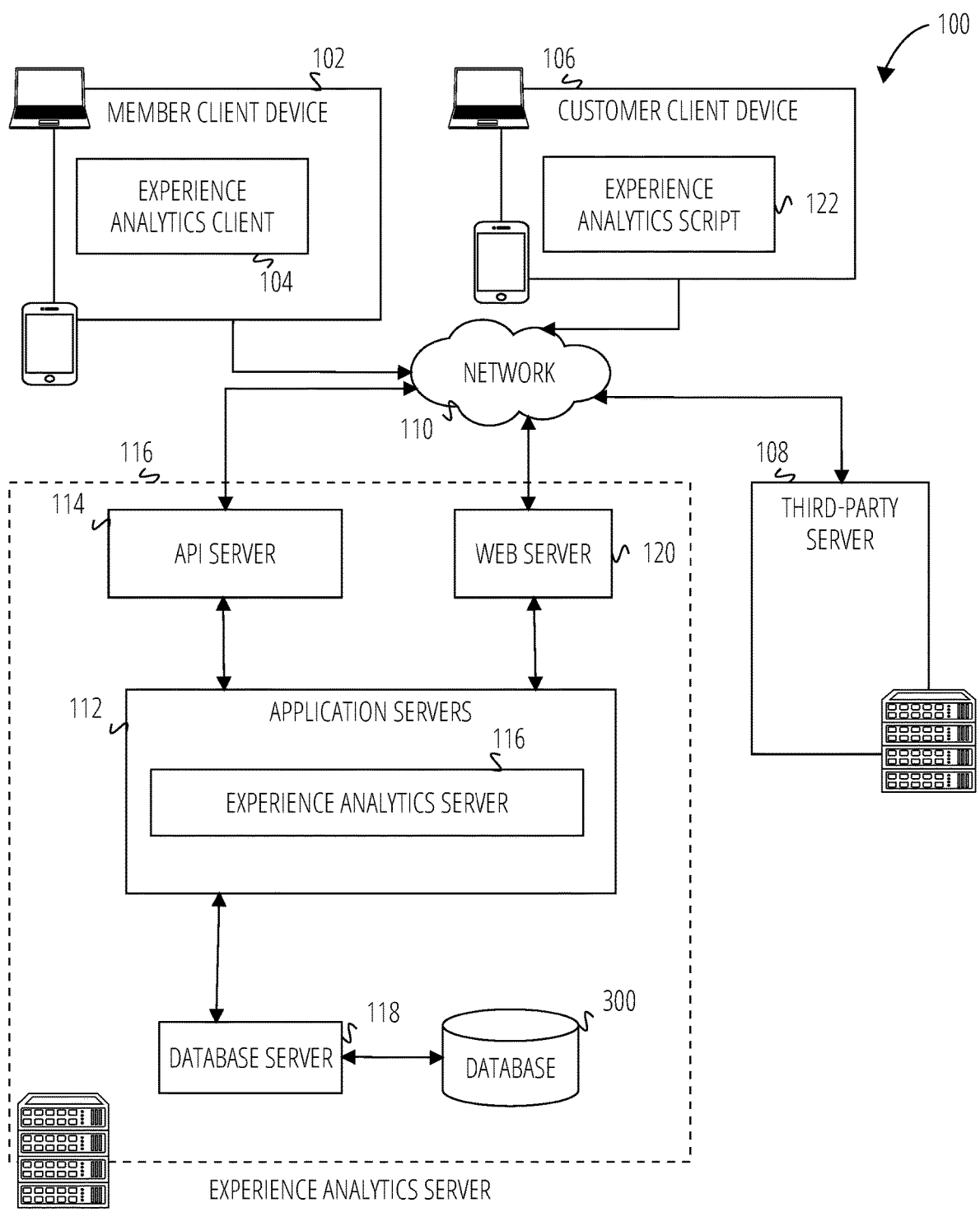
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100 that has a website hosted on by the client's third-party server 108. For example, the client can be a retail store that has an online retail website that is hosted on a third-party server 108. An agent of the client (e.g., a web master, an employee, etc.) can be the user of the member client device 102.

Each of the member client devices 102 hosts a number of applications, including an experience analytics client 104. Each experience analytics client 104 is communicatively coupled with an experience analytics server 116 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can users navigating a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server 116. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server 116 via the network 110. In another example, the experience analytics script 122 transmits the data to the third-party server 108 and the data can be transmitted from the third-party server 108 to the experience analytics server 116.

An experience analytics client 104 is able to communicate and exchange data with the experience analytics server 116 via the network 110. The data exchanged between the experience analytics client 104 and the experience analytics server 116, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server 116 supports various services and operations that are provided to the experience analytics client 104. Such operations include transmitting data to and receiving data from the experience analytics client 104. Data exchanges to and from the experience analytics server 116 are invoked and controlled through functions available via user interfaces (UIs) of the experience analytics client 104.

The experience analytics server 116 provides server-side functionality via the network 110 to a particular experience analytics client 104. While certain functions of the experience analytics system 100 are described herein as being performed by either an experience analytics client 104 or by the experience analytics server 116, the location of certain functionality either within the experience analytics client 104 or the experience analytics server 116 may be a design choice. For example, it may be technically preferable to initially deploy certain technology and functionality within the experience analytics server 116 but to later migrate this technology and functionality to the experience analytics client 104 where a member client device 102 has sufficient processing capacity.

Turning now specifically to the experience analytics server 116, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

In an embodiment, a storage platform can provide database server 118 and database server 118, where the storage platform includes multiple data storage devices (which may not be hosted by experience analytics server 116). In some embodiments, the data storage devices are cloud-based storage devices located in one or more geographic locations. For example, the data storage devices may be part of a public cloud infrastructure or a private cloud infrastructure. The data storage devices may be hard disk drives (HDDs), solid state drives (SSDs), storage clusters, AMAZON S3 storage systems or any other data storage technology. Additionally, the aforementioned storage platform may implement distributed file systems (such as Hadoop Distributed File Systems (HDFS)), object storage systems, and the like.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
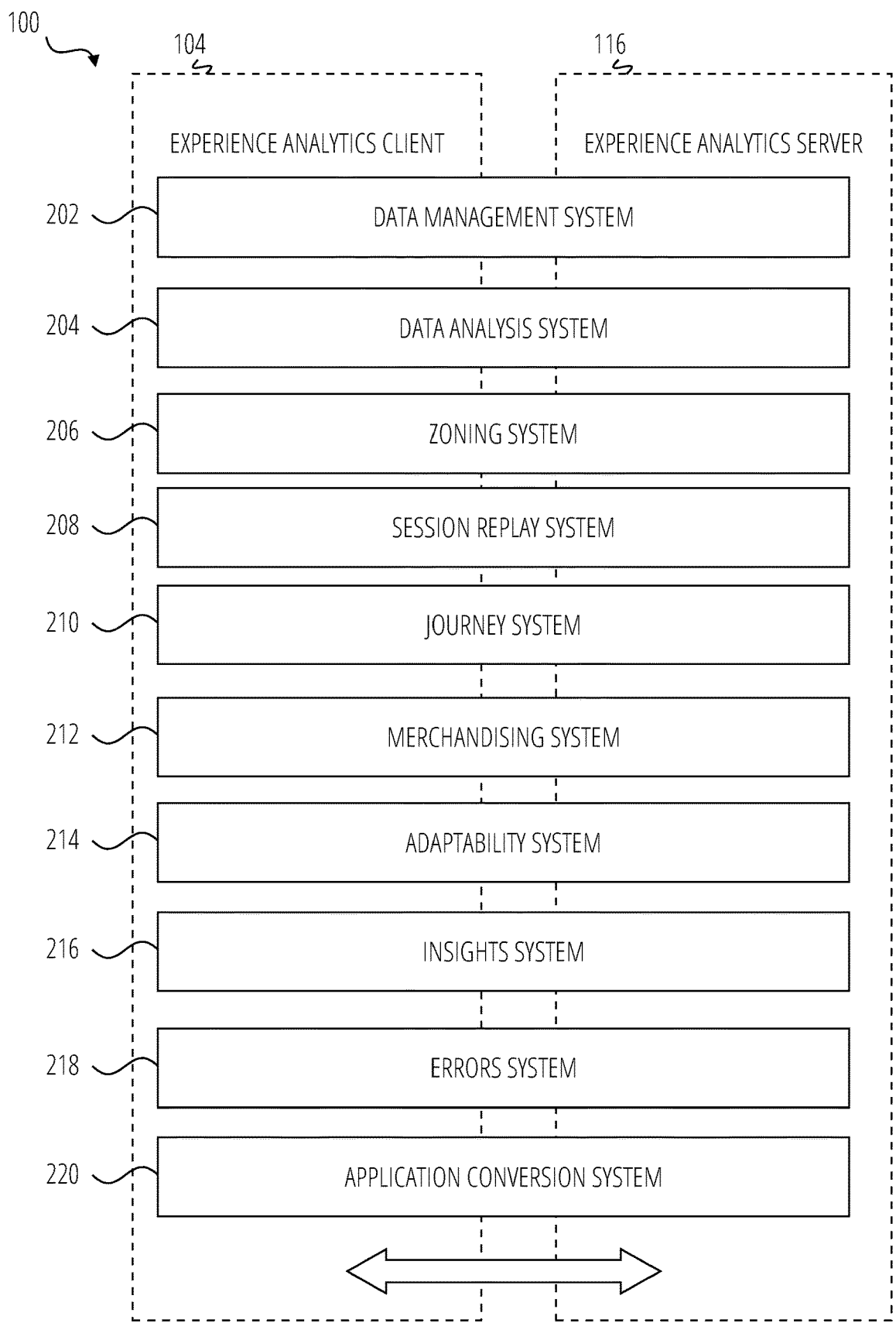
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100. As described further herein, embodiments of the data management system 202 can determine a version of a given client (e.g., web browser version, web browser type, and the like) and enable deploying an older or newer version of the experience analytics script 122 (or any related code or data) that is deployed to the client (e.g., member client device 102 or customer client device 106). More specifically, data management system 202 can enable or disable various features provided by the subject system based on the respective capabilities of the (e.g., web browser or application executing on) client device.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual visitor session on the client's website. For example, a user visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversion, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on a conversions (e.g., sales, revenue) associated with a placement or zone in the client website.

The adaptability system 214 is responsible for creating accessible digital experiences for the client's website to be displayed by the customer client devices 106 for users' that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can analyze the data from the experience analytics script 122 to determine whether an accessibility-enhanced version of the client's website is needed and generates the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on within a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that causes frustration to the users (e.g., users on customer client devices 106 visiting the client's website). The errors can also include causes of looping behaviors by the users, in-page issues such as unresponsive call to actions and slow loading pages, etc. The errors can be displayed by the member client devices 102 via the experience analytics client 104 on within a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, merchandising interface, insights interface, and errors interface to be displayed by the member client device 102 via the experience analytics client 104. The application conversion system 220 generates an accessibility-enhanced version of the client's mobile application to be displayed by the customer client devices 106.

In embodiments, as mentioned above, the data management system 202 can determine a version of a given client (e.g., web browser version, web browser type, and the like) and enable deploying an older or newer version of the experience analytics script 122 (or any related code or data) that is deployed to the client (e.g., member client device 102 or customer client device 106). More specifically, data management system 202 can enable or disable various features provided by the subject system based on the respective capabilities of the client device.

For example, experience analytics script 122 can be implemented to provide or utilize different features based on different versions of a given scripting language (e.g. JavaScript, and the like). In some instances, a given web browser or client on the client device may not fully support or be compatible with the features that utilized in the experience analytics script 122. Such features may be various functions or operations that are performed by experience analytics script 122 while tracking user activity on the client device. Thus, in some existing implementations, experience analytics script 122 includes less feature-rich code in order to support an older web browser (or application) that are executing on the client device where such code in the experience analytics script 122 may be less performant, although fully compatible, when being executed by a newer version(s) of a given web browser or application.

To address some of the disadvantages of this existing approach, embodiments of the data management system 202 can instead deploy a particular version of experience analytics script 122 depending on the capabilities of the web browser executing on the client device. In an example, newer versions of the scripting language can provide or utilize more performant functions to perform particular operations provided by experience analytics script 122, which may not be compatible with older web browser versions or application versions. In this regard, multiple versions of the experience analytics script 122 can be maintained by data management system 202, and then a particular version is selected for deploying to the client device based on the version of the web browser executing on the client device or other capabilities (e.g., based on hardware, operating system, software frameworks, and the like) of such a client device. In an example, different versions of experience analytics script 122 can be implemented as different versions of a tracking tag, which is a snippet of JavaScript code that collects and sends data for analytics from a given website. As referred to herein, the tracking tag can be understood as performing operations for gathering information or determining metrics related to user experience analytics (UXA).

In an example, the following code statements can be embedded in a given web page to execute a tracking tag:

```
<script type="text/javascript"> (function( ) {    var mt =
document.createElement("script");    mt.type = "text/javascript";
mt.async = true;    mt.src = "//t.cs.net/uxa/<YOUR_TAG_ID>.js";
document.getElementsByTagName("head")[0].appendChild(mt);    })( );
</script>
```

In an example, the above code statements creates a function that adds an asynchronous call to a script and then executes the function. In this manner, other elements loading can be avoided from being blocked on the web page. This can reduce the impact of the tracking tag on the website's performance.

In an example, the tracking tag includes 1) an object gathering configuration elements of an account, such as used domain, inclusion percentages, and the like, and 2) a newest version of the tracking tag library.

In an example, when the customer client device 106 is accessing web server 120, a first version of tracking tag can be provided to the client device. This version of the tracking tag can collect information about the client device (e.g., version of a web browser used to access web server 120) and send such information to data management system 202 (or experience analytics server 116). Based on this information, data management system 202 can determine a version of a web browser (e.g., using a user-agent string supported by the HTTP protocol or similar) that the customer client device 106 is using to access a website of a member client. In turn, data management system 202 selects a second version of the tracking tag corresponding to the web browser version, and sends the second version back to the client device. In some implementations, at least two versions of a tracking tag is maintained by data management system 202: a version for "legacy" web browsers and a different version for so-called "modern" web browsers. As referred to herein, a legacy web browser can be a particular version of a type of browser (e.g., Internet Explorer, Safari, Mozilla, Firefox, Chrome, Chromium, Edge, Brave, any mobile variants of the aforementioned browsers, and the like) that is below a predetermined version threshold (e.g., below version 12.0) or corresponds to a release date older than a predetermined date threshold (e.g., greater than 3 years before the current data to the release date). The client device then executes the second version of the tracking tag, which collects information for analytics while the client device is browsing the website.

As referred to herein, a modern web browser can be a particular version of a type of browser (e.g., Internet Explorer, Mozilla, Firefox, Chrome, Chromium, Edge, and the like) that is above or equal to a predetermined version threshold (e.g., equal to or greater than version 12.0) or corresponds to a release date newer than a predetermined date threshold from a current date (e.g., less than 3 years from the current date to the release date).

Additionally, in at least one embodiment, a particular version of JavaScript that is supported by a given web browser can be utilized as the basis for determining whether the web browser is considered legacy or modern. For example, when a particular version of a web browser only supports ECMAScript 3.1 (also known as ECMAScript, 5th Edition) (or any other ECMAScript version prior to version 5), then that web browser can be considered a legacy web browser. Further, when a particular version of a web browser supports ECMAScript 6 (also known as ECMAScript 2015), then that web browser can be considered a modern web browser.

Moreover, in some example, the web browser can be considered a modern browser through the introduction of additional features such as asynchronous code support. For example, a web browser supporting ECMAScript 2016 (also known as ECMAScript, 7th Edition) provides "async" keywords for asynchronous programming. In particular, ECMAScript 2016 provides an "async" keyword that instructs a JavaScript interpreter to treat an async function differently such that the interpreter pauses when an "await" keyword is encountered within the asynch function, and assumes that an expression after the await keyword returns a promise and waits until the promise is resolved or rejected before the interpreter moves further in the code. A given web browser that supports such functionality is therefore considered supporting additional features provided in a modern version with respect to a version of the tracking tag.

Data Architecture

Figure 3:
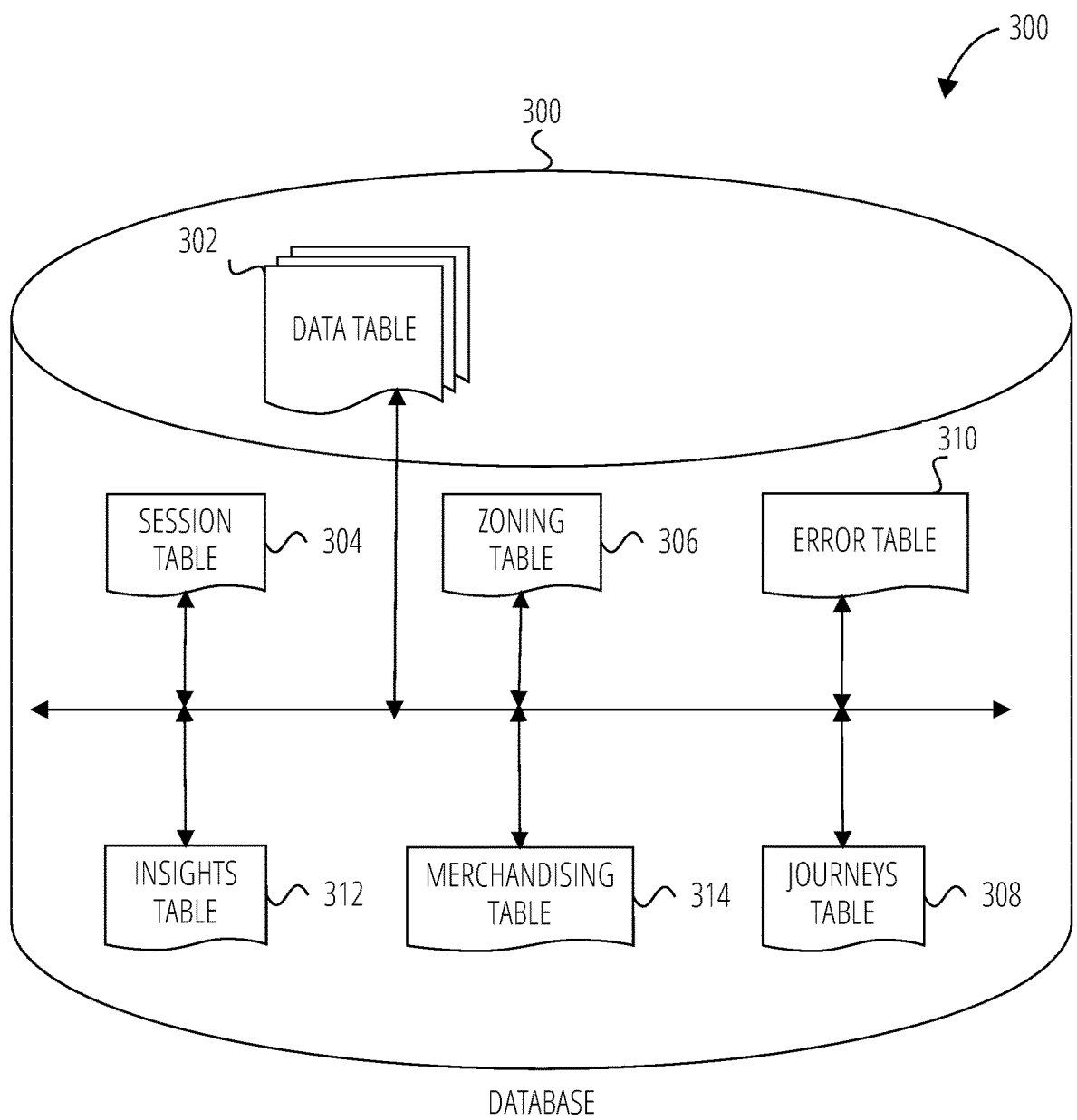
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

In embodiments, data table 302 can store different versions of a data tag corresponding to different web browsers that are utilized by customer client devices. As discussed before, data management system 202 can provide a particular version of a data tag (e.g., a tracking tag, and the like) to be more performant or compatible with a given web browser thereby enabling or disabling features or operations that are provided or performed by experience analytics script 122 (e.g., the aforementioned tracking tag).

As discussed further below in FIG. 4, in some embodiments, different storage devices or repositories can store different versions of a tracking tag (e.g., legacy version and modern version) that can be included with experience analytics script 122 for different types of web browsers (or other types of client applications or client devices) that execute on customer client device 106.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Figure 4:
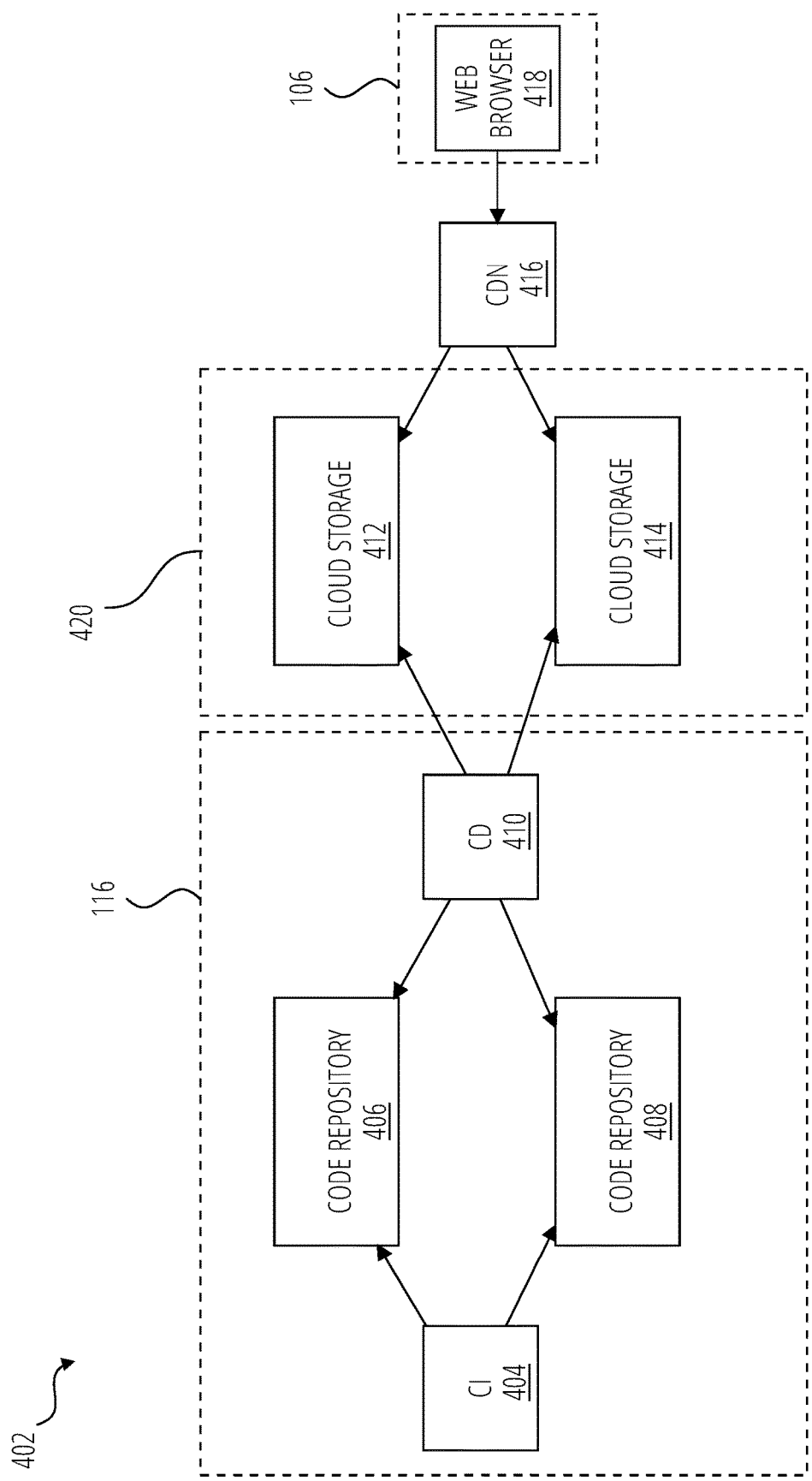
FIG. 4 illustrates an example of a system architecture in accordance with one embodiment.

FIG. 4 illustrates an example of a system architecture 402, in accordance with some embodiments of the subject technology. In the example of FIG. 4, experience analytics server 116 includes several components which are discussed further below, which perform operations with customer client device 106 to enable differentiating between a modern version(s) and legacy version(s) of a tracking tag. In an implementation, the components illustrated in FIG. 4 may be included with the data management system 202 (or experience analytics server 116). Alternatively or conjunctively, the components illustrated in FIG. 4 may be separate from the data management system 202 (or experience analytics server 116). For example, some components shown separate from experience analytics server 116 in FIG. 4 may be, in some embodiments, be included in experience analytics server 116 (or experience analytics system 100).

As shown in system architecture 402, continuous integration component 404 enables execution of a pipeline of tasks that can be performed when new or updated code is provided. In an example, such tasks may include building a new version of the tracking tag (e.g., JavaScript code or file(s) corresponding to a particular version or implementation of JavaScript, and the like) and running tests on the new version of the tracking tag. For example, a new version of the tracking tag can be provided for a legacy version of a web browser, or a different new version of the tracking tag can be provided for a modern version of a (same) web browser. Additionally, among such tasks includes publishing a new version of the tracking tag to code repository 406 that stores legacy versions of the tracking tag or publishing a new version of the tracking tag to code repository 408 that stores modern versions of the tracking tag. As used herein, publishing may include a set of operations to send code and metadata associated with a new version of the tracking tag for storing on a particular code repository. In an implementation, continuous integration component 404 utilizes a version number of the tracking tag to generate a name for the new version of the tracking tag when storing on code repository 406 or code repository 408. Such a version number can correspond to any appropriate versioning scheme utilized in software development environments and version control software (e.g., CVS, GIT, and the like).

In an embodiment, continuous integration component 404 stores information related to a history of versions of legacy versions and modern versions of the tracking tag to enable continuous integration component 404 to determine a latest version of the (legacy or modern) tracking tag or enable another component (e.g., continuous deployment component 410 or content delivery network 416) to determine such a latest version of the (legacy or modern) tracking tag. The information related to the history of versions can be stored on code repository 406 or code repository 408 and then propagated to continuous deployment component 410 for storing on cloud storage 412 or cloud storage 414. This can occur as a background process which is performed asynchronously or periodically to ensure that components throughout the subject system are informed and kept up to date regarding the latest changes and updates to version of the tracking tag(s).

Although a legacy version and modern version of the tracking tag are mentioned, it is appreciated that multiple versions of the tracking tag can be supported such that additional code repositories (e.g., in addition to code repository 406 and code repository 408) are provided by system architecture 402. For example, a third version of the tracking tag can be provided in a third code repository which may enable different features or disable other features than features included in the respective tracking tags in code repository 406 or code repository 408.

In an example, different code repositories can be provided for at least a mobile device (e.g., smartphone, tablet computer, and the like) and a desktop computer (e.g., legacy version for a mobile device web browser, modern version for a mobile device web browser, legacy version for a desktop computer web browser, and modern version for a desktop computer web browser, among other types of devices). Moreover, each code repository may be implemented as a database or provided in a given storage platform (e.g., cloud storage) as discussed below.

In an implementation, code repository 406 and code repository 408 may be local storage (e.g., database server 118) provided by experience analytics server 116. Alternatively or conjunctively, code repository 406 and code repository 408 are provided by a storage platform (e.g., storage platform 420) that includes multiple data storage devices (which may not be hosted by experience analytics server 116). As mentioned before, the data storage devices can be cloud-based storage devices located in one or more geographic locations, where the data storage devices may be part of a public cloud infrastructure or a private cloud infrastructure. Such data storage devices may be hard disk drives (HDDs), solid state drives (SSDs), storage clusters, AMAZON S3 storage systems or any other data storage technology. Additionally, the aforementioned storage platform may implement distributed file systems (such as Hadoop Distributed File Systems (HDFS)), object storage systems, and the like.

System architecture 402 also include continuous deployment component 410. Continuous deployment component 410 performs operations to retrieve new version(s) of the tracking tag from code repository 406 and code repository 408. In turn, continuous deployment component 410 deploys the new version of the tracking tag to cloud storage 412 and cloud storage 414 provided by storage platform 420. In this example, cloud storage 412 stores a new version of the tracking tag for a legacy browser, while cloud storage 414 stores a new version of the tracking tag for a modern browser. In an embodiment, with each subsequent (e.g., newer version) version of the tracking tag, continuous deployment component 410 can store the subsequent version in cloud storage without overwriting the current version of the tracking tag already stored on cloud storage. In another embodiment, continuous deployment component 410 can store the subsequent version in cloud storage by overwriting the current version of the tracking tag already stored on cloud storage (e.g., deleting the current version and then writing the subsequent version to cloud storage effectively replacing the current version).

In an embodiment, each of cloud storage 412 and cloud storage 414 may represent a respective datacenter with clusters of servers, or can represent individual servers. Each of such servers can include data storage devices for storing data (e.g., tracking tag). Moreover, although only two cloud storage instances are shown in the example of FIG. 4, it is appreciated that more than two cloud storage instances can be provided for storing a version(s) of a tracking tag as discussed herein. Also as mentioned above, storage platform 420 may be any of the aforementioned types of data storage devices.

In an embodiment, continuous deployment component 410 generates a hash value corresponding to a particular user which can be utilized, in part, to generate a particular name for the tracking tag when storing on either cloud storage 414 or cloud storage 412. This hash-based approach therefore can associate the tracking tag to the particular user.

Customer client device 106 executes a web browser 418 where the browser can be either a legacy web browser or a modern web browser. In an example, web browser 418 sends a request to content delivery network 416 for a tracking tag. In turn, content delivery network 416 includes logic which enables determining which type of tracking tag is to be provided to web browser 418. Content delivery network 416 may be a web service providing delivery of web content (e.g., static and dynamic content including HTML, CSS, JavaScript, images, and the like). In an embodiment, content delivery network 416 delivers content using a network of servers, and when a web browser (e.g., web browser 418) requests content such as a tracking tag, such a request is processed and then sent to one of cloud storage 412 or cloud storage 414 to retrieve the tracking tag.

In an implementation, content delivery network 416 determines, based on information included in the request (e.g., metadata in a header such as a user agent field in a HTTP request header, or any other information in the HTTP request header), whether to retrieve the legacy or modern version of the tracking tag from cloud storage 412 or cloud storage 414. In an embodiment, a newest or latest version of the tracking tag is requested from cloud storage 412 or cloud storage 414 irrespective of whether multiple versions of the tracking tag are stored in cloud storage. However, it is appreciated that in embodiments in which multiple versions of the tracking tag are stored in cloud storage, a particular version other than the newest version can be requested for retrieval.

An example of a user agent field can be the following:

User-Agent: Mozilla/5.0 (<system-information>) <platform> (<platform-details>) <extensions>

In the above example, the user agent field includes system information, platform information, and platform details. In an implementation, the user agent field includes a list of product tokens (keywords) with optional comments, such as a product name and version, or a layout engine and version. From the above example, platform information describes the native platform that the browser is running on (e.g., Windows, Mac, Linux, Android, and the like) and if it is a mobile device. Platform details include information related to a browser platform such as a browser engine (e.g., KHTML, Gecko, and the like). Extensions include information including features and capabilities of the browser such as specific enhancements that are available directly in the browser or through third parties (e.g., plugins).

An example of a user agent field for a desktop computer can be the following:

```
Mozilla/5.0 (X11; Linux x86_64) AppleWebKit/537.36 (KHTML,
like
Gecko) Chrome/51.0.2704.103 Safari/537.36
```

An example of a user agent field for a mobile device can be the following:

```
Mozilla/5.0 (iPhone; CPU iPhone OS 13_5_1 like Mac OS X)
AppleWebKit/605.1.15 (KHTML, like Gecko) Version/13.1.1
Mobile/15E148 Safari/604.1
```

In an example, content delivery network 416 identifies, from at least one token of the user agent field, a version of the web browser 418 that corresponds to the platform of the web browser 418. Using at least this identified version, content delivery network 416 can determine whether the web browser 418 should receive a modern or legacy version of the tracking tag. To facilitate this determination, content delivery network 416 can maintain a registry of different versions of web browsers for different platforms indicating whether a modern or legacy version of the tracking tag is supported by the corresponding web browsers, and search the registry to match information (e.g., tokens) from the user agent field to information stored in the registry. Based on the determination (e.g., matching information in the registry), content delivery network 416 can determine which of cloud storage 412 or cloud storage 414 to retrieve the modern or legacy version of the tracking tag.

In an embodiment, the aforementioned registry can include a set of entries where each entry includes information indicating that a modern version of legacy version of the tracking tag is associated with a particular version of a given web browser 418 to facilitate matching information extracted from the user agent field to an entry. Other information can be included in each entry such as a hash associated with a particular user as discussed herein, or any information (e.g., platform, platform details, extensions, and the like) included in the user agent field as discussed herein. In some implementations, the registry can be a database, a flat file, or blob storage, and the like.

After retrieving one (e.g., legacy version or modern version) of the tracking tags, content delivery network 416 sends the retrieved tracking tag to the web browser 418. In turn, web browser 418 executes the tracking tag to perform operations related to analytics and user activity connected to a particular web page(s) of a website. In an implementation, after being retrieved, the tracking tag can be embedded on each requested web page of the website. In another implementation, for each requested web page, web browser 418 can send a request to content delivery network 416 for a particular tracking tag, which after being retrieved is then subsequently embedded (and executed) on the web page.

In an implementation, content delivery network 416 can be required to process the request to retrieve the tracking tag based on a time constraint where the tracking tag should be sent to web browser 418 less than a threshold of time (e.g., less than 1 millisecond, and the like).

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

The following process relates to determining which version (e.g., modern or legacy) to provide to a web browser of a client device to ensure compatibility, reduction of errors, and provide optimal performance for executing the tracking tag by the web browser.

Figure 5:
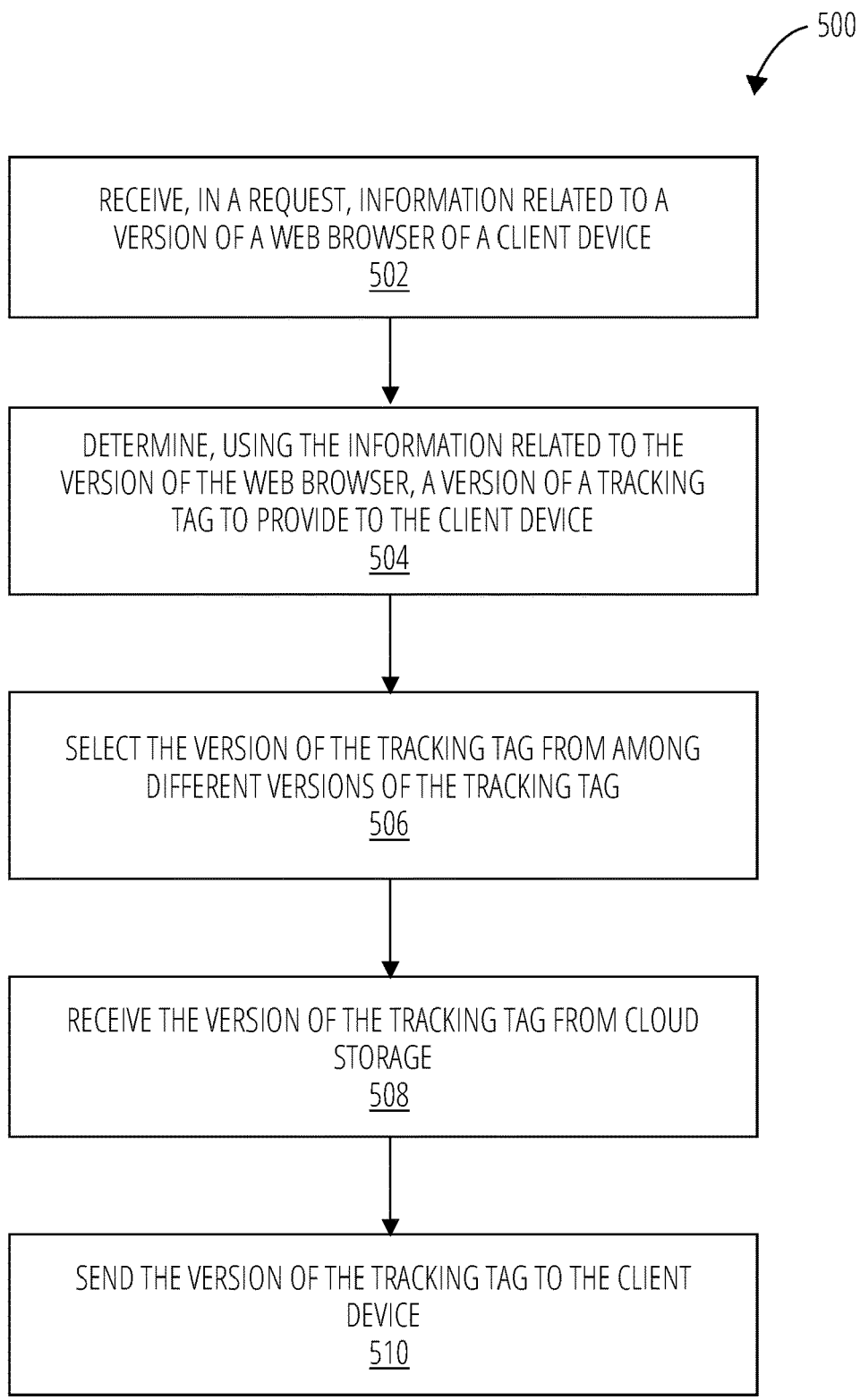
FIG. 5 is a flowchart for a process, in accordance with some examples.

FIG. 5 is a schematic diagram illustrating a process 500. As discussed below, data management system 202 is described as performing operations of process 500. Moreover, although not mentioned below, it is understood that components described above in FIG. 4 can perform, where appropriate, an operation of process 500 as discussed below.

At operation 502, the data management system 202 a receives, in a request, information related to a version of a web browser (e.g., web browser 418) of a client device (e.g., customer client device 106.

In an embodiment, the request is received by a web service providing distribution of web content, and the request was submitted from the web browser of the client device.

In an embodiment, the information related to the version of the web browser is included in a user agent field, the user agent field comprising a plurality of tokens.

At operation 504, the data management system 202 determines, using the information related to the version of the web browser, a version of a tracking tag to provide to the client device.

In an embodiment, determining, using the information related to the version of the web browser, the version of the tracking tag includes: identifying, from the plurality of tokens, a first token indicating a first keyword, the first keyword comprising a version of the web browser; and identifying, from the plurality of tokens, a second token indicating a second keyword, the second keyword comprising a platform of the web browser.

At operation 506, data management system 202 selects the version of the tracking tag from among different versions of the tracking tag, each version of the tracking tag comprising different code from code of other versions of the tracking tag.

In an embodiment, selecting the version of the tracking tag from among different versions of the tracking tag includes: searching a registry storing information for different versions of web browsers, the registry comprising a set of entries; identifying a match between an entry in the registry and the first token and the second token; determining, based on information of the entry in the registry, whether a first version or second version of the tracking tag is to be retrieved, the first version corresponding to a modern version and the second version corresponding to a legacy version; and sending a request to the cloud storage to retrieve the version of the tracking tag for the web browser based on the determining.

In an embodiment, the information of the entry in the registry includes information related to the version of the web browser, information related to a platform of the web browser, and information related to platform details of the web browser.

At operation 508, data management system 202 receives the version of the tracking tag from cloud storage.

At operation 510, data management system 202 sends the version of the tracking tag to the client device.

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

In some embodiments, the subject system can determine that a currently utilized tracking tag can be updated to a newer version. As discussed before, a newer version of a tracking tag can be pushed out and eventually stored in cloud storage. However, in some instances, an older version of the tracking tag is already embedded on web pages of a given website and therefore is executed by a web browser of a client device. The subject system, in such instances, can update this older version of the tracking tag to ensure that the latest version is provided to the web browser, which improves compatibility of the tracking tag to components of experience analytics system 100.

Figure 6:
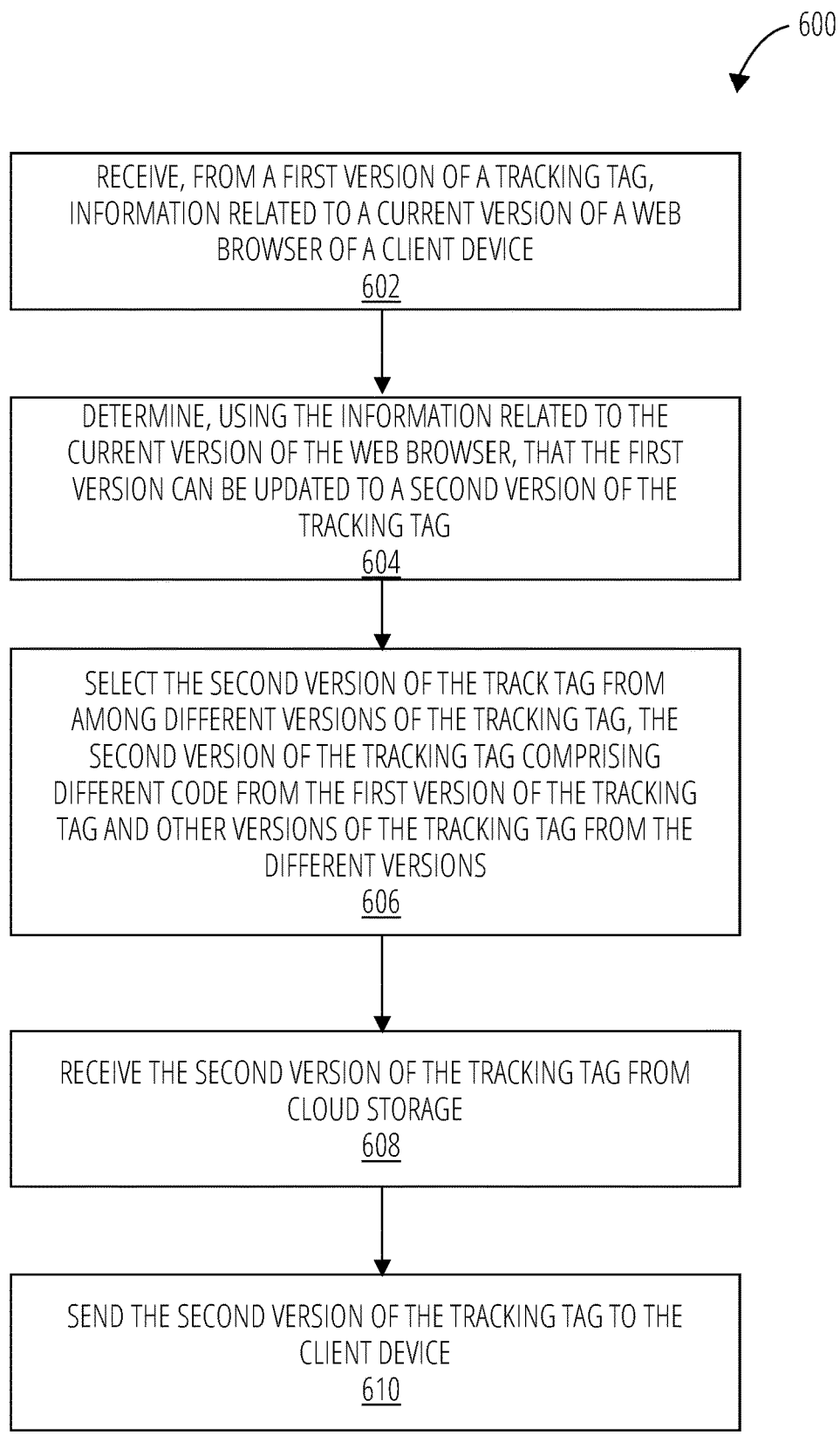
FIG. 6 is a flowchart for a process, in accordance with some examples.

FIG. 6 is a schematic diagram illustrating a process 600. As discussed below, data management system 202 is described as performing operations of process 600. Moreover, although not mentioned below, it is understood that components described above in FIG. 4 can perform, where appropriate, an operation of process 600 as discussed below.

At operation 602, the data management system 202 a receives, from a first version of a tracking tag, information related to a version of a web browser (e.g., web browser 418) of a client device (e.g., customer client device 106).

At operation 604, the data management system 202 determines, using the information related to the version of the web browser, a second version of the tracking tag.

In an embodiment, determining, using the information related to the current version of the web browser, that the first version can be updated to the second version of the tracking tag comprises: determining that the tracking tag has been updated to a newer version corresponding to the second version based on metadata provided in the cloud storage.

At operation 606, data management system 202 selects the second version of the track tag from among different versions of the tracking tag, the second version of the tracking tag comprising different code from the first version of the tracking tag and other versions of the tracking tag from the different versions.

In an embodiment, selecting the second version of the tracking tag comprises: searching the cloud storage for the second version of the tracking tag; and retrieving the second version of the tracking tag from the cloud storage based on the searching.

At operation 608, data management system 202 receives the second version of the tracking tag from the cloud storage.

At operation 610, data management system 202 sends the second version of the tracking tag to the client device. Subsequently, the second version of the tracking tag is embedded in a web page of the website associated with the tracking tag.

Machine Architecture

Figure 7:
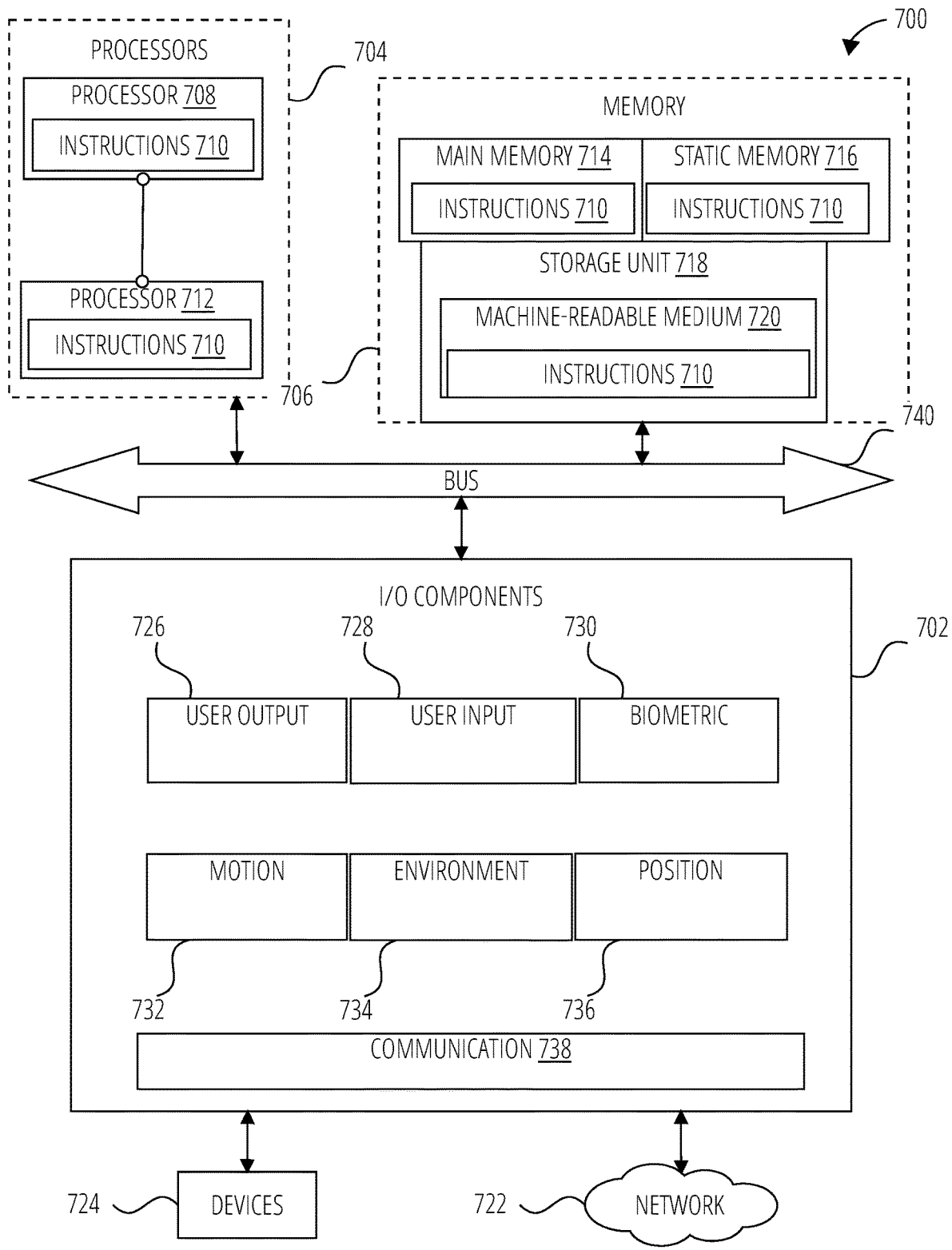
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an application, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the member client device 102 or any one of a number of server devices forming part of the experience analytics server 116. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 702, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
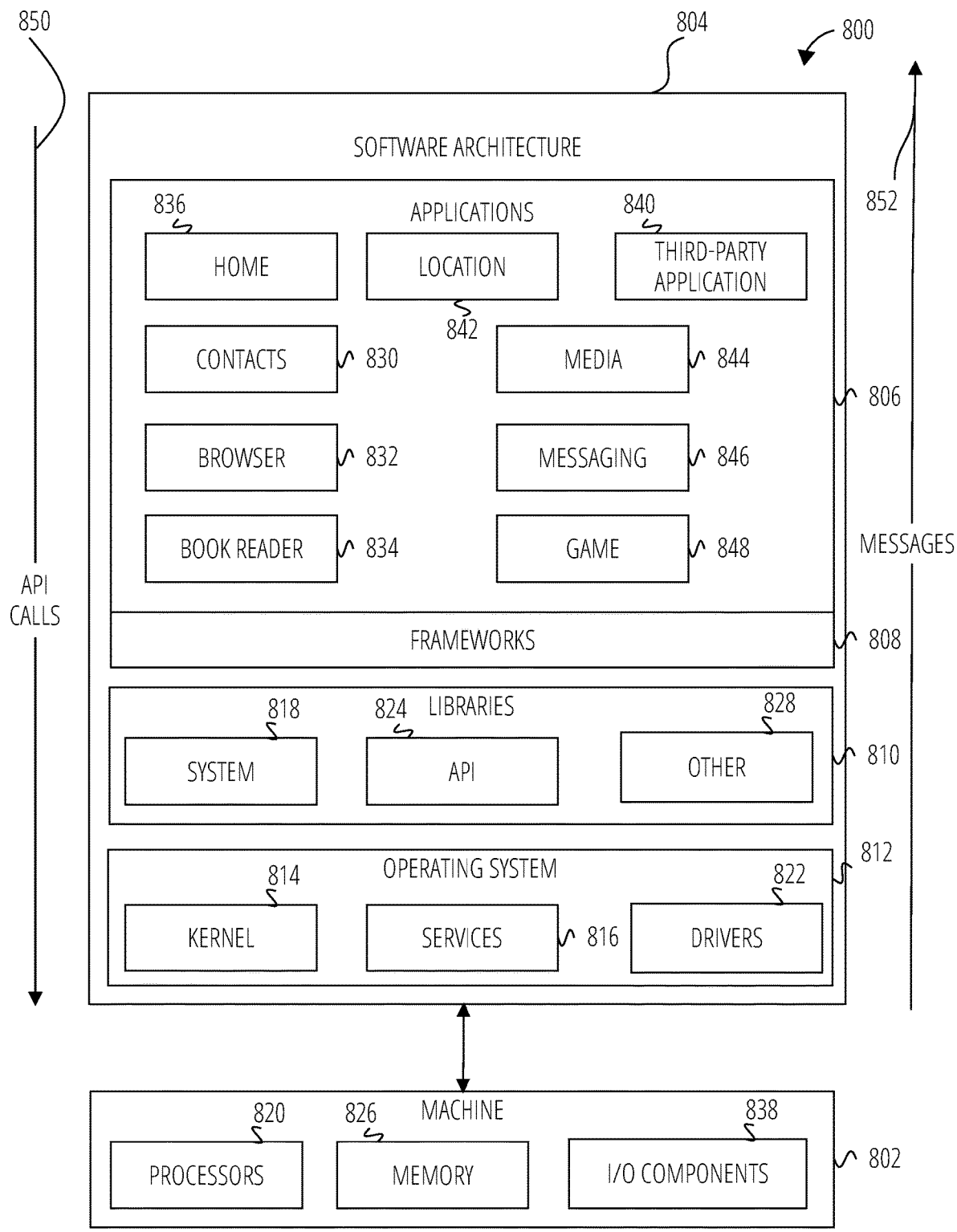
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    receiving by a data management system, in a request, information related to a version of a web browser of a client device;
    determining by the data management system, using the information related to the version of the web browser, a different version of a tracking tag to provide to the client device, the client device being provided an initial version of the tracking tag after accessing a web server;
    selecting, by the data management system, the different version of the tracking tag from among a set of different versions of the tracking tag, each version of the tracking tag comprising different code from code of other versions of the tracking tag, the set of different versions of the tracking tag including a first version of the tracking tag and a second version of the tracking tag, the first version of the tracking tag being compatible with a first version of the web browser, the second version of the tracking tag being compatible with a second version of the web browser, and the first version of the web browser not being compatible with the second version of the tracking tag based at least in part on a particular set of operations that are performed by the second version of the tracking tag, the second version of the web browser being a newer version of the web browser than the first version of the web browser, wherein selecting the version of the tracking tag is based at least in part on determining that the version of the web browser corresponds to the first version or the second version of the web browser, the first version of the tracking tag disables a first set of operations that are performed by the first version, and the second version of the tracking tag enables the set of operations that, when performed, are more performant with the second version of the web browser than with the first version of the web browser;
    receiving, by the data management system, the selected different version of the tracking tag from cloud storage; and
    sending, by the data management system, the selected different version of the tracking tag to the client device, the data management system and the cloud storage being different from the web server that provided the initial version of the tracking tag.

2. The method of claim 1, wherein the request was submitted from the web browser of the client device, and further comprising:
    retrieving, by a continuous deployment component, a new version of the tracking tag from a code repository; and
    deploying, by the continuous deployment component, the new version of the tracking tag to the cloud storage, the new version of the tracking tag being a newer version than the different version of the tracking tag.

3. The method of claim 1, wherein the information related to the version of the web browser is included in a user agent field, the user agent field comprising a plurality of tokens.

4. The method of claim 3, wherein determining, using the information related to the version of the web browser, the version of the tracking tag comprises:
    identifying, from the plurality of tokens, a first token indicating a first keyword, the first keyword comprising a version of the web browser; and
    identifying, from the plurality of tokens, a second token indicating a second keyword, the second keyword comprising a platform of the web browser.

5. The method of claim 4, wherein selecting the version of the tracking tag from among different versions of the tracking tag comprises:
    searching a registry storing information for different versions of web browsers, the registry comprising a set of entries;
    identifying a match between an entry in the registry and the first token and the second token;
    determining, based on information of the entry in the registry, whether a first version or second version of the tracking tag is to be retrieved, the first version corresponding to a modern version and the second version corresponding to a legacy version; and
    sending a request to the cloud storage to retrieve the version of the tracking tag for the web browser based on the determining.

6. The method of claim 5, wherein the information of the entry in the registry comprises information related to the version of the web browser, information related to a platform of the web browser, and information related to platform details of the web browser.

7. The method of claim 1, further comprising:
receiving, from a first version of a tracking tag, information related to a current version of the web browser of the client device; and
determining, using the information related to the current version of the web browser, that the first version can be updated to a second version of the tracking tag.

8. The method of claim 7, wherein determining, using the information related to the current version of the web browser, that the first version can be updated to the second version of the tracking tag comprises:
determining that the tracking tag has been updated to a newer version corresponding to the second version based on metadata provided in the cloud storage.

9. The method of claim 7, further comprising:
selecting the second version of the tracking tag from among different versions of the tracking tag, the second version of the tracking tag comprising different code from the first version of the tracking tag and other versions of the tracking tag from the different versions;
receiving the second version of the tracking tag from the cloud storage; and
sending the second version of the tracking tag to the client device.

10. The method of claim 7, wherein selecting the second version of the tracking tag comprises:
searching the cloud storage for the second version of the tracking tag; and
retrieving the second version of the tracking tag from the cloud storage based on the searching.

11. A system comprising:
a processor; and
a memory storing instructions that, when executed by the processor, configure the system to perform operations comprising:
receiving by a data management system, in a request, information related to a version of a web browser of a client device;
determining by the data management system, using the information related to the version of the web browser, a different version of a tracking tag to provide to the client device, the client device being provided an initial version of the tracking tag after accessing a web server;
selecting, by the data management system, the different version of the tracking tag from among a set of different versions of the tracking tag, each version of the tracking tag comprising different code from code of other versions of the tracking tag, the set of different versions of the tracking tag including a first version of the tracking tag and a second version of the tracking tag, the first version of the tracking tag being compatible with a first version of the web browser, the second version of the tracking tag being compatible with a second version of the web browser, and the first version of the web browser not being compatible with the second version of the tracking tag based at least in part on a particular set of operations that are performed by the second version of the tracking tag, the second version of the web browser being a newer version of the web browser than the first version of the web browser, wherein selecting the version of the tracking tag is based at least in part on determining that the version of the web browser corresponds to the first version or the second version of the web browser, the first version of the tracking tag disables a first set of operations that are performed by the first version, and the second version of the tracking tag enables the set of operations that, when performed, are more performant with the second version of the web browser than with the first version of the web browser;
receiving, by the data management system the selected different version of the tracking tag from cloud storage; and
sending, by the data management system, the selected different version of the tracking tag to the client device, the data management system and the cloud storage being different from the web server that provided the initial version of the tracking tag.

12. The system of claim 11, wherein the request was submitted from the web browser of the client device.

13. The system of claim 11, wherein the information related to the version of the web browser is included in a user agent field, the user agent field comprising a plurality of tokens.

14. The system of claim 13, wherein determining, using the information related to the version of the web browser, the version of the tracking tag comprises:
identifying, from the plurality of tokens, a first token indicating a first keyword, the first keyword comprising a version of the web browser; and
identifying, from the plurality of tokens, a second token indicating a second keyword, the second keyword comprising a platform of the web browser.

15. The system of claim 14, wherein selecting the version of the tracking tag from among different versions of the tracking tag comprises:
searching a registry storing information for different versions of web browsers, the registry comprising a set of entries;
identifying a match between an entry in the registry and the first token and the second token;
determining, based on information of the entry in the registry, whether a first version or second version of the tracking tag is to be retrieved, the first version corresponding to a modern version and the second version corresponding to a legacy version; and
sending a request to the cloud storage to retrieve the version of the tracking tag for the web browser based on the determining.

16. The system of claim 15, wherein the information of the entry in the registry comprises information related to the version of the web browser, information related to a platform of the web browser, and information related to platform details of the web browser.

17. The system of claim 11, wherein the operations further comprise:
receiving, from a first version of a tracking tag, information related to a current version of the web browser of the client device; and
determining, using the information related to the current version of the web browser, that the first version can be updated to a second version of the tracking tag.

18. The system of claim 17, wherein determining, using the information related to the current version of the web browser, that the first version can be updated to the second version of the tracking tag comprises:
determining that the tracking tag has been updated to a newer version corresponding to the second version based on metadata provided in the cloud storage.

19. The system of claim 17, wherein the operations further comprise:
selecting the second version of the tracking tag from among different versions of the tracking tag, the second version of the tracking tag comprising different code from the first version of the tracking tag and other versions of the tracking tag from the different versions;

receiving the second version of the tracking tag from the cloud storage; and sending the second version of the tracking tag to the client device.

20. The system of claim 17, wherein selecting the second version of the tracking tag comprises:

searching the cloud storage for the second version of the tracking tag; and retrieving the second version of the tracking tag from the cloud storage based on the searching.

21. A non-transitory computer-readable storage medium, the computer-readable storage medium including instructions that when executed by a computer, cause the computer to perform operations comprising:

receiving by a data management system, in a request, information related to a version of a web browser of a client device;

determining by the data management system, using the information related to the version of the web browser, a different version of a tracking tag to provide to the client device, the client device being provided an initial version of the tracking tag after accessing a web server;

selecting, by the data management system, the different version of the tracking tag from among a set of different versions of the tracking tag, each version of the tracking tag comprising different code from code of other versions of the tracking tag, the set of different versions of the tracking tag including a first version of the tracking tag and a second version of the tracking tag, the first version of the tracking tag being compatible with a first version of the web browser, the second version of the tracking tag being compatible with a second version of the web browser, and the first version of the web browser not being compatible with the second version of the tracking tag based at least in part on a particular set of operations that are performed by the second version of the tracking tag, the second version of the web browser being a newer version of the web browser than the first version of the web browser, wherein selecting the version of the tracking tag is based at least in part on determining that the version of the web browser corresponds to the first version or the second version of the web browser, the first version of the tracking tag disables a first set of operations that are performed by the first version, and the second version of the tracking tag enables the set of operations that, when performed, are more performant with the second version of the web browser than with the first version of the web browser;

receiving, by the data management system, the selected different version of the tracking tag from cloud storage; and sending, by the data management system, the selected different version of the tracking tag to the client device, the data management system and the cloud storage being different from the web server that provided the initial version of the tracking tag.

22. The non-transitory computer-readable storage medium of claim 21, wherein the request was submitted from the web browser of the client device.

23. The non-transitory computer-readable storage medium of claim 21, wherein the information related to the version of the web browser is included in a user agent field, the user agent field comprising a plurality of tokens.

24. The non-transitory computer-readable storage medium of claim 23, wherein determining, using the information related to the version of the web browser, the version of the tracking tag comprises:

identifying, from the plurality of tokens, a first token indicating a first keyword, the first keyword comprising a version of the web browser; and identifying, from the plurality of tokens, a second token indicating a second keyword, the second keyword comprising a platform of the web browser.

25. The non-transitory computer-readable storage medium of claim 24, wherein selecting the version of the tracking tag from among different versions of the tracking tag comprises:

searching a registry storing information for different versions of web browsers, the registry comprising a set of entries;

identifying a match between an entry in the registry and the first token and the second token;

determining, based on information of the entry in the registry, whether a first version or second version of the tracking tag is to be retrieved, the first version corresponding to a modern version and the second version corresponding to a legacy version; and sending a request to the cloud storage to retrieve the version of the tracking tag for the web browser based on the determining.

26. The non-transitory computer-readable storage medium of claim 25, wherein the information of the entry in the registry comprises information related to the version of the web browser, information related to a platform of the web browser, and information related to platform details of the web browser.

27. The non-transitory computer-readable storage medium of claim 21, wherein the operations further comprise:

receiving, from a first version of a tracking tag, information related to a current version of the web browser of the client device; and determining, using the information related to the current version of the web browser, that the first version can be updated to a second version of the tracking tag.

28. The non-transitory computer-readable storage medium of claim 27, wherein determining, using the information related to the current version of the web browser, that the first version can be updated to the second version of the tracking tag comprises:

determining that the tracking tag has been updated to a newer version corresponding to the second version based on metadata provided in the cloud storage.

29. The non-transitory computer-readable storage medium of claim 27, wherein the operations further comprise:

selecting the second version of the tracking tag from among different versions of the tracking tag, the second version of the tracking tag comprising different code from the first version of the tracking tag and other versions of the tracking tag from the different versions;

receiving the second version of the tracking tag from the cloud storage; and sending the second version of the tracking tag to the client device.

30. The non-transitory computer-readable storage medium of claim 27, wherein selecting the second version of the tracking tag comprises:
- searching the cloud storage for the second version of the tracking tag; and
- retrieving the second version of the tracking tag from the cloud storage based on the searching.

\* \* \* \* \*